(No Model.)
J. DYER.
COFFEE BOILER.
No. 305,805. Patented Sept. 30, 1884.
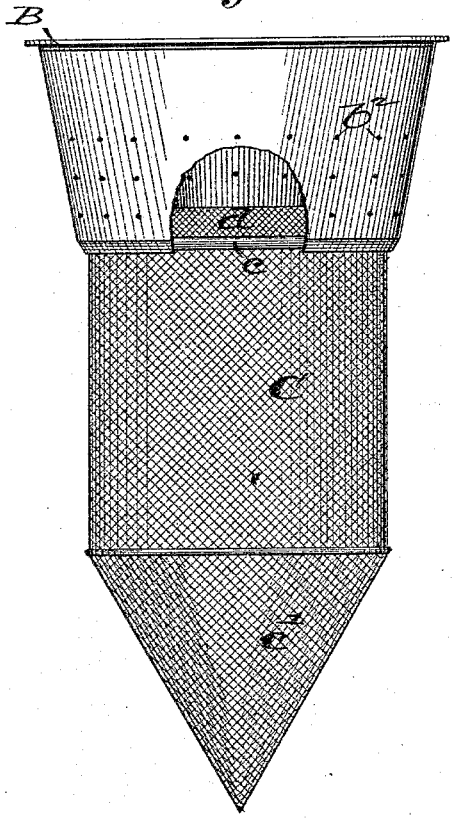
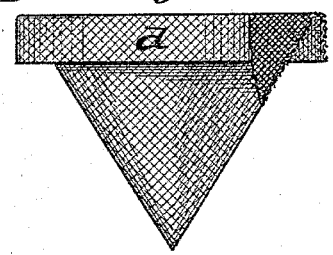
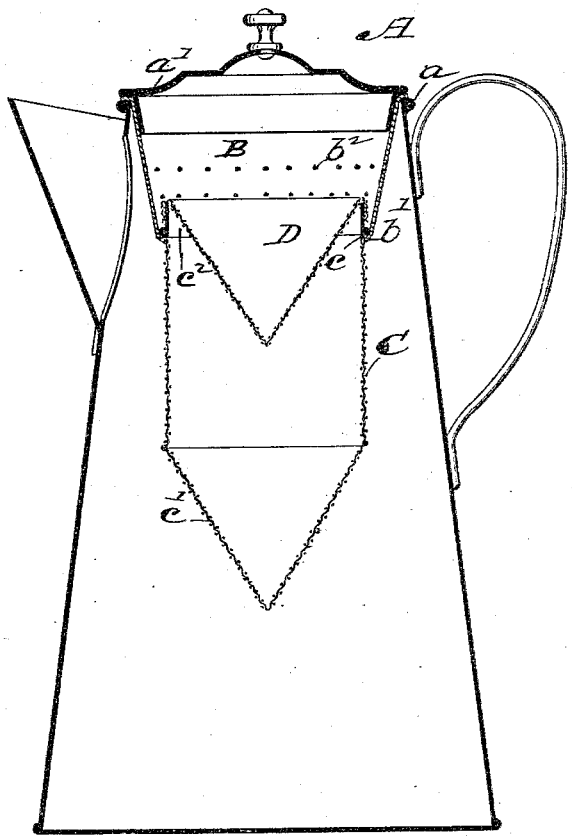
Attest:
Charles Pickle
E. E. Hunt
Inventor:
James Dyer
by C D Moody
atty

UNITED STATES PATENT OFFICE.

JAMES DYER, OF ST. LOUIS, MISSOURI.

COFFEE-BOILER.

SPECIFICATION forming part of Letters Patent No. 305,805, dated September 30, 1884.

Application filed February 19, 1884. (No model.)

*To all whom it may concern:*

Be it known that I, JAMES DYER, of St. Louis, Missouri, have made a new and useful Improvement in Coffee-Boilers, of which the following is a full, clear, and exact description, reference being had to the annexed drawings, making part of this specification, in which—

Figure 1 is a side elevation of the attachment, a portion of the supporting-flange being broken away to exhibit the interior of the construction; Fig. 2, a side elevation of the water-straining cone, a portion of it being broken away; and Fig. 3, a vertical section of a coffee-boiler having the attachment.

The same letters of reference denote the same parts.

The present improvement is an attachment which can be applied to an ordinary coffee-boiler for the purpose of holding the coffee in suspension in the water during the making of the coffee decoction, and also for the purpose of straining the water as it is poured into the boiler. The attachment can be readily placed in position in the coffee-boiler, and as readily withdrawn therefrom. All of its parts can be easily cleaned, and when in place in the coffee-pot the ordinary lid can be used in the ordinary way, so that the outward appearance of the coffee-pot is not changed.

It consists in the construction, substantially as hereinafter described, and designated in the claims.

A represents a coffee-boiler of the customary form.

B represents a flange which is adapted to be suspended from the upper edge, $a$, of the coffee-boiler. The flange extends downward into the coffee-boiler, and at its lower end is provided with an inwardly-turned flange, $b'$. It is also perforated at $b^2$. This flange in turn serves to support a receptacle, C, the receptacle having a bead, $c$, which rests upon the flange $b'$. The receptacle is mainly cylindrical in form, but it is provided with a conical bottom $c'$, and it is an open-work construction throughout to enable the water used in making the coffee to pass freely through it.

D represents a perforated or open-work cone, which is suspended in the upper end of the receptacle C, for which purpose the cone D is provided with a flange, $d$, which fits onto the flange $c^2$ of the receptacle C.

The parts B C D constitute the attachment in question, which in use is applied as shown in Fig. 3. The coffee from which the decoction is to be made is placed in the receptacle C. The cone D is then placed in position, and the water poured into the coffee-boiler. The water flows downward through the cone D into the coffee-boiler. Any excess of water may flow through the perforations $b^2$ of the flange B. The flange B and cone D serve to strain the water of impurities, and the receptacle C serves to hold the coffee in suspension in the coffee-boiler during the making of the coffee decoction. The coffee-boiler is provided with the ordinary cover $a'$, which serves to close the boiler, it being fitted into the flange B, as shown in Fig. 3. During the making of the coffee the water circulates freely through the receptacle C, and the coffee is prevented from escaping from the receptacle into the space surrounding it.

The coffee when made can be poured from the boiler without removing the attachment, there being space in the boiler sorrounding the attachment for the discharge of the coffee decoction.

After using the attachment it can be readily lifted out of the boiler and cleaned, and in cleaning it the various parts may be readily detached from each other. The cone D may be removed from the receptacle C, and the receptacle in turn can be slipped upward through the flange B. In this manner all the parts of the attachment can be easily got at and cleaned, after which they can be replaced in their respective positions in the coffee-boiler.

I claim—

1. The combination of the perforated suspending flange having rims at both ends, the cylindro-conical strainer C, provided with a bead, $c$, near its upper end, and the reticulated conical strainer D, having a flange, $d$, said parts being adapted for use in a coffee-pot, and constructed substantially as described.

2. The combination of the perforated flange

B, the reticulated cylindro-conical strainer C, detachable therefrom, and the reticulated flanged cone D, detachable from the said parts, all constructed and adapted to operate substantially as described.

3. The combination, with a coffee-pot provided with a spout and cover, of the perforated flange B, the reticulated receptacle C, and the flanged cone D, constructed to be detachable, and arranged and supported substantially in the manner and for the purposes described.

Witness my hand.

JAMES $\overset{\text{his}}{+}$ DYER.
mark.

Witnesses:
C. D. MOODY,
C. E. HUNT.